(12) United States Patent
Cai et al.

(10) Patent No.: US 7,348,705 B2
(45) Date of Patent: Mar. 25, 2008

(54) MULTI-PHASE FRACTIONAL SLOT WINDINGS FOR ELECTRIC MACHINES HAVING SEGMENTED BAR-SHAPED WINDINGS

(75) Inventors: William Cai, Carmel, IN (US); David Fulton, Anderson, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 81 days.

(21) Appl. No.: 11/187,138

(22) Filed: Jul. 21, 2005

(65) Prior Publication Data
US 2007/0018525 A1    Jan. 25, 2007

(51) Int. Cl.
H02K 3/28 (2006.01)
H02K 3/12 (2006.01)

(52) U.S. Cl. .................... 310/184; 310/201
(58) Field of Classification Search ........... 310/179, 310/180, 184
See application file for complete search history.

(56) References Cited

U.S. PATENT DOCUMENTS 5,764,036 A * 6/1998 Vaidya et al. .............. 322/90
6,759,780 B2 7/2004 Liu et al.
6,894,417 B2 5/2005 Cai et al.
2003/0214196 A1* 11/2003 Cai et al. .................... 310/208
2004/0217723 A1 11/2004 Cai et al.
2006/0006655 A1* 1/2006 Kanazawa et al. ......... 290/40 B

OTHER PUBLICATIONS

Michael Liwschitz-Garik, Celso Gentilini, "Winding Alternating Current Machines", Samul Hellen Associate, New York, 1982, 8 pages.

* cited by examiner

Primary Examiner—Burton Mullins
(74) Attorney, Agent, or Firm—Maginot, Moore & Beck (57) ABSTRACT

An electric machine comprises a stator core defining a plurality of slots. Multi-phase fractional slot windings are positioned in the slots of the stator core. The multi-phase winding include a first winding set comprised of a first plurality of conductors having a substantially rectangular cross-sectional shape and a second winding set comprised of a second plurality of conductors having a substantially rectangular cross-sectional shape. The multi-phase fractional slot windings include a non-integer slots per pole per phase value.

11 Claims, 8 Drawing Sheets

PHASE B CONNECTIONS

FIG. 4

CONNECTIONS OF JUMPERS AND TERMINALS

PRIOR ART

MULTI-PHASE FRACTIONAL SLOT WINDINGS FOR ELECTRIC MACHINES HAVING SEGMENTED BAR-SHAPED WINDINGS

BACKGROUND

This invention relates to the field of electric machines, and more particularly, electric machines for automotive vehicles.

Electric machines are important components of conventional internal combustion engine automobiles. For example, electric machines typically serve as starting motors to crank automobile engines. Other electric machines serve as alternators that generate electricity from engine motion and deliver power to automobile loads.

Electric machines are also very important in modern hybrid electric vehicles (HEVs). HEVs combine an internal combustion engine with an electric drive system powered by a battery bank. In these hybrid vehicles, electric machines are typically required to operate as (a) a starter motor, (b) an electric drive and drive assist (i.e., propulsion and propulsion boost), (c) a generator which provides electric power for onboard electric loads and charges the battery banks, and (d) a re-generator which converts kinetic energy from the vehicle to electric power for charging the battery bank during braking/deceleration of the vehicle.

Hybrid Electric Vehicles can operate with low fuel consumption and low air-pollution. There are two propulsion systems onboard the HEV: (i) the traditional diesel or gasoline engine, and (ii) the electric drive system. The additional electric drive system consists of an energy storage compartment in the form of a battery bank, control components in the form of a power electronics unit, and an electric machine conversion component operable to convert electrical energy to mechanical energy and vice-versa. Thus, the electric drive system provides engine cranking, propulsion, power generation and power regeneration.

The electric machine is a core component in the HEV's electric drive system. The electric machine will run under the motoring state during vehicle starting, during pure electric drive and during electric assist drive. The electric machine is required to operate under the normal generating state during engine drive (thereby charging batteries) and the re-generating state during vehicle braking. Of course, the efficiency of the electric machine will directly govern the efficiency of electric drive system and consequently the fuel economy of the vehicle.

As the power conversion component in an electric drive system, the electric machine interacts directly or indirectly with the drive shaft or engine shaft and is located "under the hood" of the vehicle. However, the space available for the electric machine in the required "under the hood" location is typically limited. Therefore, the size and dimensions of the electric machine must be as small as possible. Compared to other applications for electric machines, high efficiency and small size are more important to the electric machine onboard the HEV. Furthermore, automobile manufacturers are increasingly calling for high efficiency and small size for almost all electrical machine applications in vehicles. Therefore, the need for small and mid-sized electric machines having high efficiency and small size is applicable to all automotive vehicles, and is particularly applicable to HEVs and purely electric vehicles.

One way to reduce the size and increase the efficiency of an electric machine is to increase the slot-fill-ratio (SFR) of the electric machine. SFR is typically defined as the ratio of (a) the aggregate cross-sectional area of bare copper conductors in a slot to (b) the cross-sectional area of the slot itself. With a high SFR, the large cross-sectional area of the copper wires helps reduce the phase resistance and consequently the resistance of the windings (i.e., power loss) for a given slot size, so the efficiency of the machine is improved. Accordingly, a high SFR allows more efficient electric machines to be built at a smaller size than less efficient predecessors.

Figure 7A:
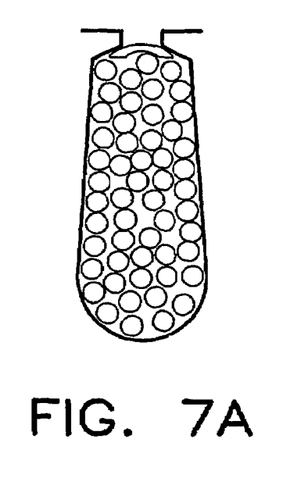
FIG. 7A shows a cross-sectional view of a slot showing a typical round wire windings in the slot.

Armature windings of most small and mid-sized electric machines are typically wound in many turns with single or multiple strands of round conductors in the form of round wires. FIG. 7A shows an exemplary prior art stator slot having a plurality of round conductors in the stator slot. The SFR in these machines with round conductors is typically between 35% and 45%. This relatively low SFR causes either low efficiency for given machine size or large package dimension for given performance requirement.

In the automotive industry, marine industry, and aerospace industry, the machine package size and efficiency have become very important, because available on-board space and fuel economics are critical requirements for machines in these industries. Reducing winding resistance by increasing SFR is one important strategy that may be used to improve torque density and efficiency for electrical machines with limited machine dimensions. In the past, rectangular conductors, such as those shown in FIG. 7B have been used in many of these machines to increase SFR and consequently lower winding resistance. These rectangular conductors are typically bar-shaped conductors consisting of either single or multiple strands of wire having a rectangular cross-sectional shape. In some machines, the bar-shaped wires are pre-shaped before the wires are placed into the stator slots. However, unlike thin strands of round wires, pre-shaped continuous bar wound windings cannot be laid into semi-closed slots, which are often preferred as discussed below.

Figure 7B:
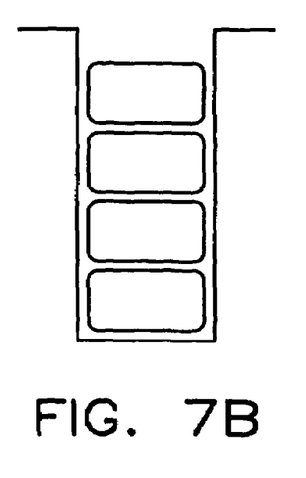
FIG. 7B shows a cross-sectional view of an open slot showing typical bar-shaped windings in the slot.
Figure 7C:
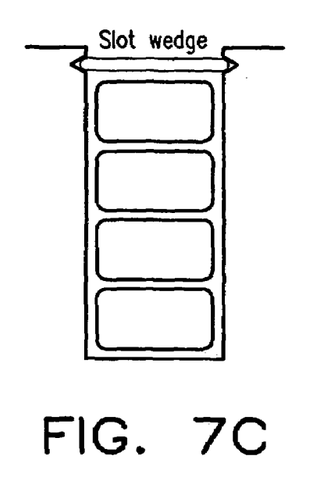
FIG. 7C shows a cross-sectional view of a slot with a slot wedge and typical bar shaped windings in the slot.
Figure 7D:
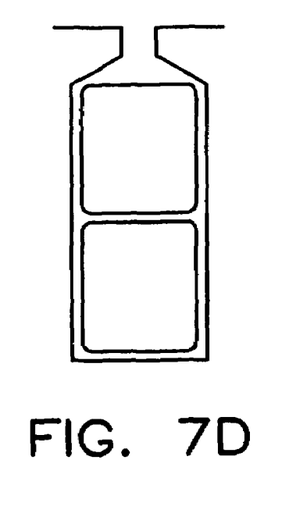
FIG. 7D shows a cross-sectional view of a partially closed slot with two bar-shaped conductors in the slot from a single winding set.
Figure 7E:
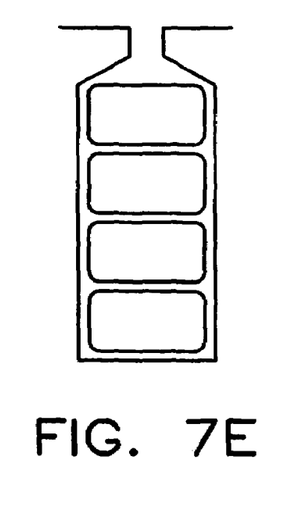
FIG. 7E shows a cross-sectional view of a partially closed slot with four bar-shaped conductors in the slot from two different winding sets.

To insert pre-shaped continuous bar windings into the slots of a stator, open slots are necessary, such as those shown in FIG. 7B. The openings in these slots allow the continuous windings to be inserted from the inner diameter of the core. However, closed or semi-closed slots, such as those shown in FIGS. 7C and 7D are typically preferred, as these slots can minimize winding vibration and damage that would otherwise occur in an open slot. Furthermore, semi-closed slots reduce equivalent air-gap length and harmonic flux density, as is known to those of skill in the art. Slot wedges, such as those shown in FIG. 7C, are sometimes used to provide the operational advantages of closed or semi-closed slots with the manufacturing advantages of open slots. These slot wedges include a wedge of magnetic material inserted in the open end of the slot.

To achieve the high SFR benefits of rectangular bar-shaped conductors and the operational benefits of semi-closed or closed slots, the U-shaped segmented conductors (also referred to herein as "hairpins" or "U-shaped bars") of rectangular cross-section have been used in the past. A typical application of hairpin windings was 50DN alternator produced by Remy International since the middle of the last century. A cross-sectional view of the rectangular conductors in the core of the 50DN machine is shown in FIG. 7D. In the 50DN machine, the conductor wire is first cut into many segments with each segment having a certain length. The straight segments of wire are then bent and twisted into U-shaped conductors (or "hairpin" conductors) with the proper span. The hairpin conductors are inserted into closed or semi-closed slots from an insertion end of the stator. After the hairpin conductors are inserted into slots with slot liners, the legs of the hairpin conductors extend from a connection end of the stator. These legs are then bent to appropriate positions. Finally the proper leg ends are connected together to complete the windings. These connections include adjacent leg ends that are aligned directly and welded together or non-adjacent leg ends that are connected through jumper wires. Together, the connected conductors form the complete armature windings.

Figure 5A:
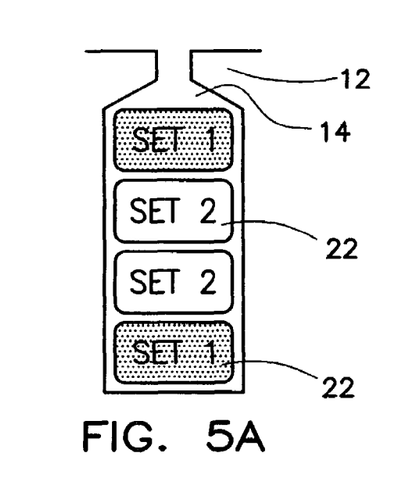
FIG. 5A shows a first exemplary arrangement for two sets of bar-shaped conductors in a stator slot.
Figure 5B:
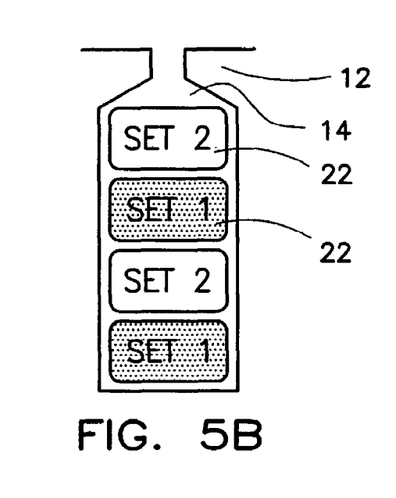
FIG. 5B shows a second exemplary arrangement for two sets of bar-shaped conductors in a stator slot.
Figure 5C:
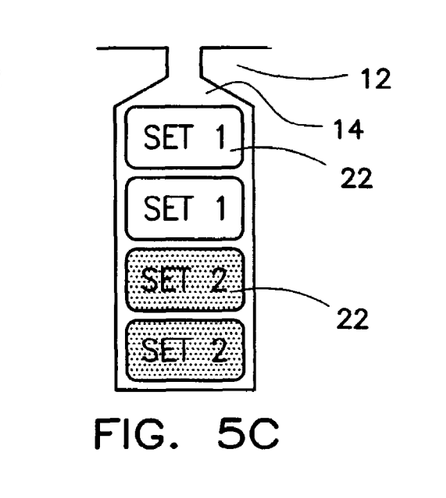
FIG. 5C shows a third exemplary arrangement for two sets of bar-shaped conductors in a stator slot.
Figure 6A:
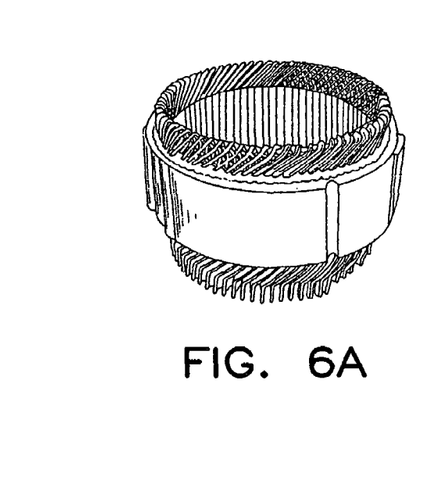
FIG. 6A shows a stator having two sets of bar-shaped conductor windings arranged as shown in FIG. 5A.
Figure 6B:
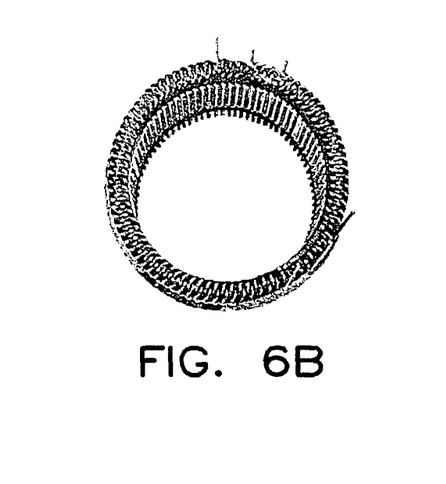
FIG. 6B shows a stator having two sets of bar-shaped conductor windings arranged as shown in FIG. 5B.
Figure 6C:
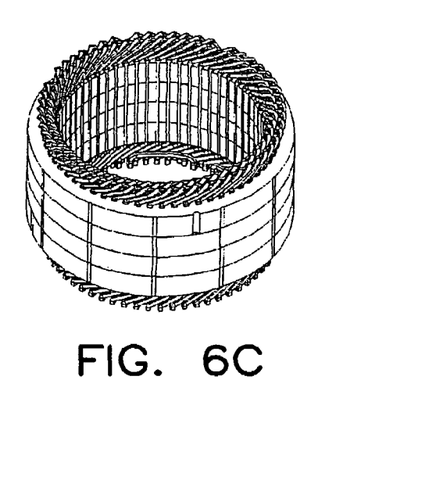
FIG. 6C shows a stator having two sets of bar-shaped conductor windings arranged as shown in FIG. 5C.

When large conductors, either round or rectangular shape, are used as armature windings, AC resistance in the windings increases with conductor size because of the phenomena known as skin effect. This resistance is experienced especially in the dimension of the slot height direction. The increment of AC resistance due to skin and approximation effect of larger conductors becomes even more pronounced at high frequency. Therefore, the conductor size, especially the dimension in the slot height direction, has to be limited in order to reduce AC resistance incremental losses in electrical machines. Lowering AC resistance losses is a principal strategy in designing electric machines with more poles and high efficiency at high speed. Reduction of conductor height/thickness in the slot produces more conductors in the slot height direction. For example, the traditional one set of windings (i.e., two conductors per slot, such as that shown in FIG. 7D) is replaced by two or more sets of windings in which there are four, six or even more conductor in slot height direction (see, e.g., FIGS. 5A-5C). The four or more conductors in a slot can be arranged in various winding set configurations. For example, the four conductors in a slot can be arranged as follows:

(a) one U-hairpin over another (see FIG. 5A and the corresponding stator of FIG. 6A);
(b) one U-hairpin crossing another (see FIG. 5B and the corresponding stator of FIG. 6B); and
(c) one U-hairpin side-by-side with another (see FIG. 5C and the corresponding stator of FIG. 6C).

One common characteristic for the above arrangements with multi-set hairpins inserted into a core with a number of slots is that the slots per pole per phase (q) is an integer, i.e., q=integer.

Another common characteristic of hairpin wound electric machines is that they often are wound using wave windings. While lap windings can provide more parallel paths, more jumping connections are required at the end-turn region of the machine. These jumping connections are undesirable because they either crowd the end area of the core and increase the potential for short circuits, or require additional space that increases the package size. To reduce the jumpers or connection wires, a wave wound strategy is applied in most segmented U-shape bar windings. Generally, wave wound windings provide one or two parallel paths per phase in real production.

The number of turns in series per phase (i.e., $N_{ph}$) is used to adapt the system voltage and torque for a given pole number and package size of an electric machine. For multi-set rectangular hairpin windings, $N_{ph}$ can be expressed as $$N_{ph}=2pqS/a \quad \text{(equation 1)}$$

where p=Number of pole pairs;
q=Slots per pole per phase;
S=Number of winding sets; and
a=Number of parallel paths per phase, which is 1 or 2 for wave windings and any integer number of 2p/a for lap windings.

For example, for a three phase machine having 2 winding sets (S=2), 12 poles (p=6), and wave windings with one parallel path per phase (a=1), the following series turns per phase is calculated:

$$N_{ph}=2pqS/a=(2)\cdot(6)\cdot q\cdot(2)/(1)=24q$$

Obviously, in this example, the series turns per phase winding can only vary with the integer times 12, if q=integer. In other words, $N_{ph}$=24, 48, 72, 96, etc. However, in practice, q cannot be too large because of physical limitations on the total number of armature slots. Variation of pole pairs p could be used to obtain a different series turns per phase value, $N_{ph}$, but this is still very limited.

Therefore, it would be advantageous to provide an electric machine operable for use in the automotive industry, marine industry, and aerospace industry, where the slots per pole per phase of the electric machine is not limited to an integer number such that numerous different series turns per phase may be achieved. Specifically, it would be desirable to provide an electric machine winding where an optimal number of turns in series per phase is provided such that the electric machine is operable to deliver the desired system voltage and torque for a given pole number and package size.

SUMMARY

An electric machine is disclosed herein comprising a stator core defining a plurality of slots. Multi-phase fractional slot windings are positioned in the slots of the stator core. The multi-phase winding include a first winding set comprised of a first plurality of conductors having a substantially rectangular cross-sectional shape and a second winding set comprised of a second plurality of conductors having a substantially rectangular cross-sectional shape. The first plurality of conductors and the second plurality of conductors comprise at least four layers of conductors in each of the plurality of stator slots. The first plurality of conductors are positioned in the first and second layer of the plurality of stator slots and the second plurality of conductors are positioned in the third and fourth layers of the plurality of stator slots. The multi-phase fractional slot windings include a non-integer slots per pole per phase value.

A method of designing the electric machine comprises determining desired size requirements for the electric machine, a desired system voltage for the electric machine, a desired number of poles of the electric machine, and desired torque requirements. Thereafter, an appropriate turns in series per phase for the windings of the electric machine is calculated based on the desired system voltage and the desired size requirements. Next, a slots per pole phase per phase value for the electric machine is calculated based on the turns in series per phase of the windings of the electric machine, wherein the slots per pole per phase value is a non-integer value. Windings are provided for the electric machine using a plurality of bar-shaped conductors of substantially rectangular cross-sectional shape.

DESCRIPTION

Figure 1:
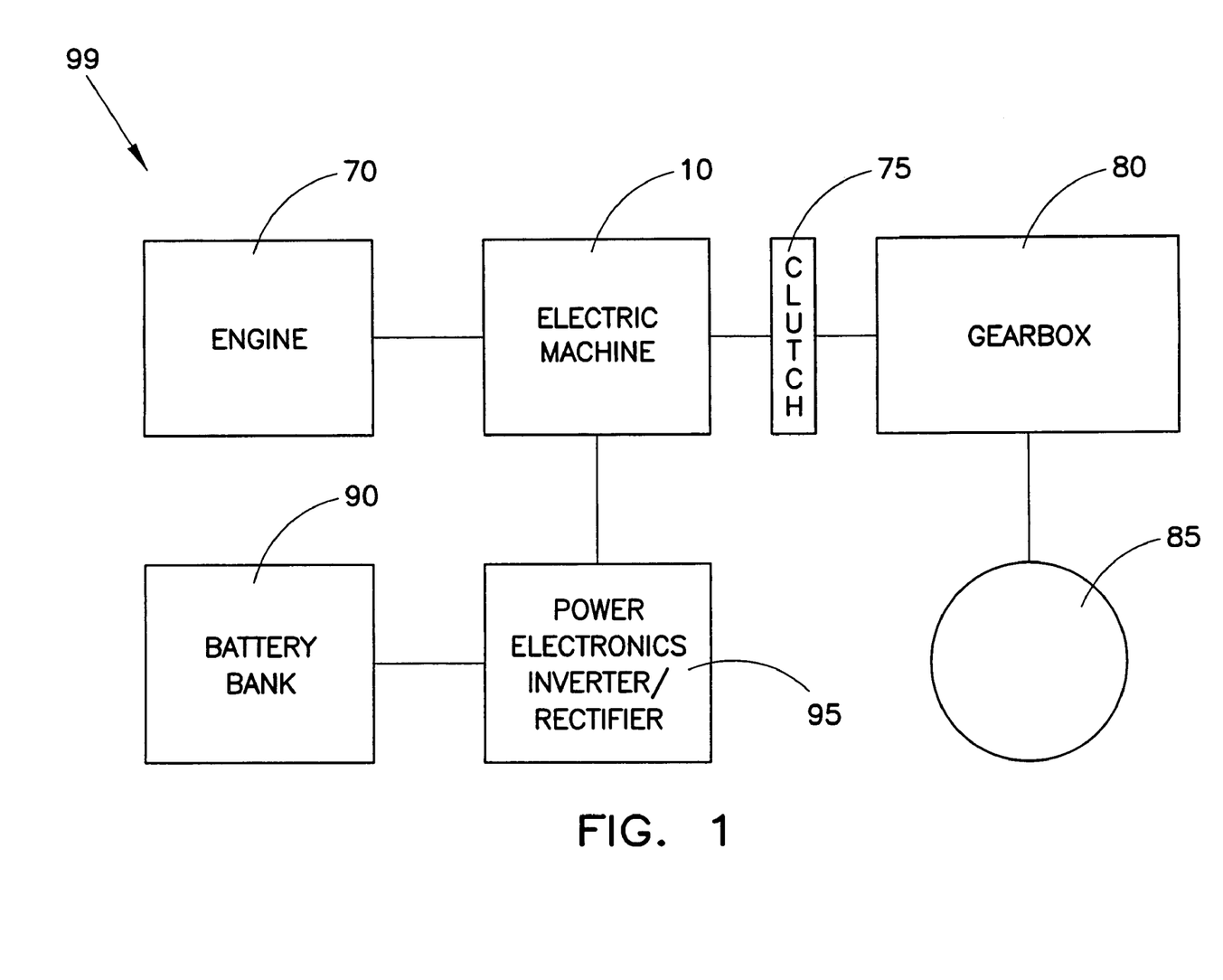
FIG. 1 shows a block diagram of an electric machine with multiphase fractional slot windings in relation to other components in the drive train of a hybrid electric vehicle.

With reference to FIG. 1, an electric machine including multiphase fractional slot windings is provided as part of a hybrid electric drive system 99, such as the drive system for a hybrid electric vehicle. The hybrid electric drive system 99 comprises the electric machine with fractional slot windings 10 which is operably connected to the drive shaft of an internal combustion engine 70. The electric machine 10 is also operably connected to a gearbox 80 through a torque converter or clutch 75. The gearbox is operable to drive the wheels 85 of the hybrid electric vehicle. In addition, the electric machine 10 is operably connected to a battery bank 90 through a power electronics inverter/rectifier 95. The power electronics inverter/rectifier 95 is operable to deliver electric power to the electric machine or absorb electric power from the batteries.

During operation of the hybrid electric vehicle, the electric machine acts as both a motor and a generator. Motoring operations include starter motor operation and vehicle drive operation. First, the electric machine 10 operates as an electric starting motor that cranks internal combustion engine 70. During this time of engine cranking, the clutch 75 disengages the gearbox 80 from the electric machine. During low speed vehicle drive operations, the clutch 75 connects the electric machine 10 and the gearbox 80, allowing the electric machine to act as the propulsion drive, turning the wheels 85 of the vehicle. The electric machine 10 may also act as a propulsion assist for the vehicle during vehicle acceleration. During high speed vehicle driving, the electric machine 10 is driven by the internal combustion engine 70 and operates as an alternator, providing electric power for onboard electric loads and charging the battery bank. Finally, during vehicle braking and deceleration, the electric machine 10 acts as a re-generator which converts kinetic energy from the vehicle to electric power for charging the battery bank 90.

It will be recognized that the drive system of FIG. 1 is but one embodiment of a drive system arrangement for a hybrid electric vehicle, and other drive systems are possible. For example, in some embodiments on or two electric machines may completely replace the mechanical transmission in FIG. 1.

Figure 2A:
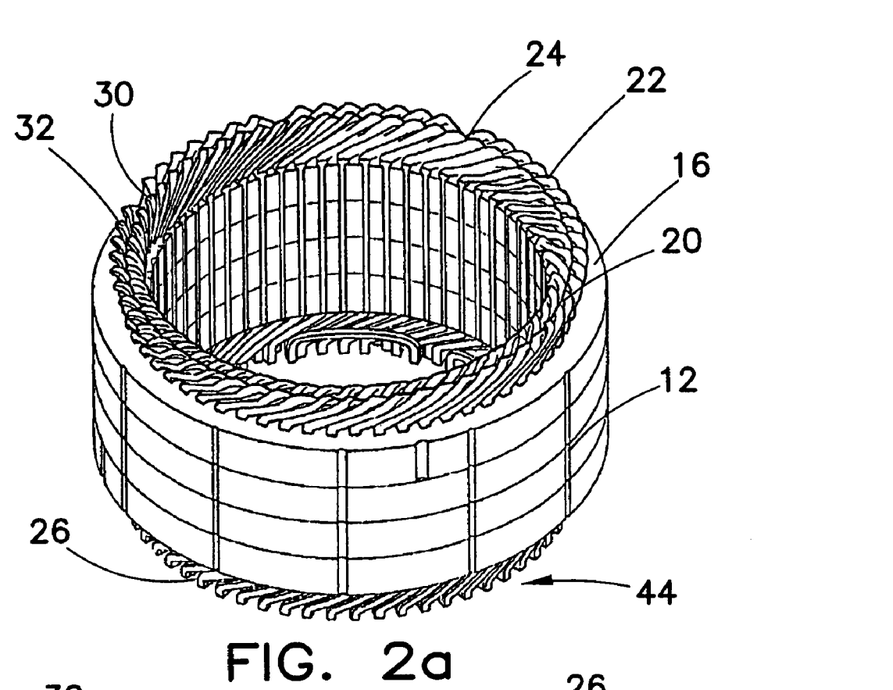
FIG. 2A shows a perspective view of a stator core of the electric machine of FIG. 1, the stator core is wound with rectangular conductors comprised of two winding sets.
Figure 2B:
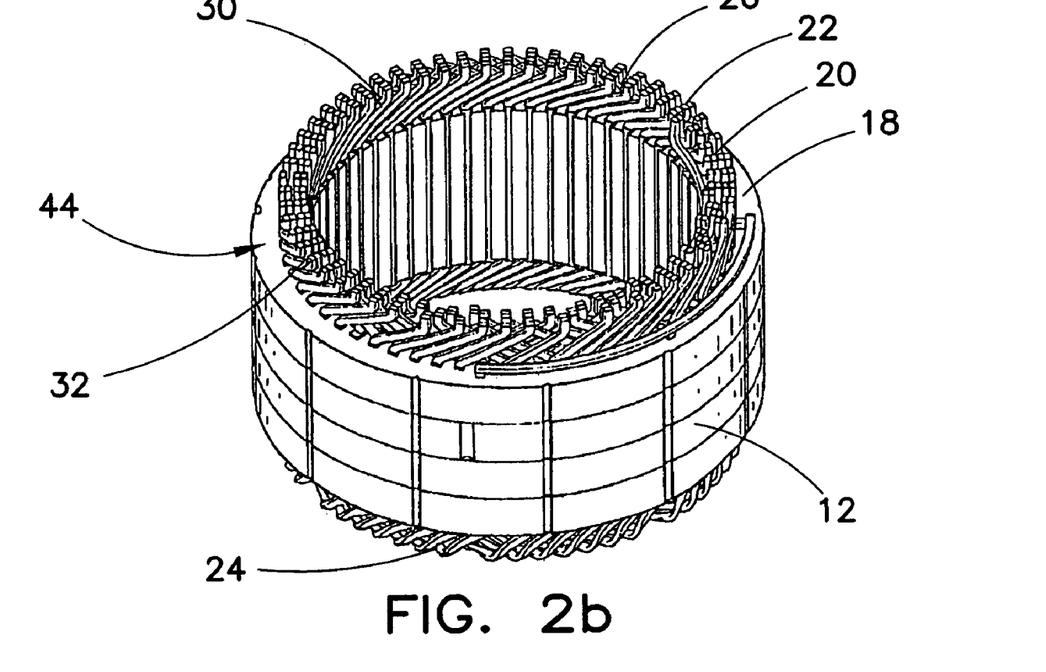
FIG. 2B shows a perspective view of the stator core of FIG. 2A, as viewed from an opposite end of the core.

Referring now to FIGS. 2A and 2B, an electric machine including multiphase fractional slot windings 10 comprises a stator core 12 having a multi-set rectangular hairpin windings 20 formed thereon. A rotor core (not shown) is designed to mount within the stator core 12. The rotor core includes windings or permanent magnets that interact with the poles of the stator. The stator 12 includes a plurality of partially closed slots 14 (see FIG. 4). A plurality of conductor segments 22 are positioned within the slots of the stator and form a plurality of winding sets 30 and 32 upon the stator. Each winding set 30 and 32 includes a phase A winding, a phase B winding, and a phase C winding. The winding sets 30 and 32 are each adjacent to each other upon the stator, with one of the winding sets forming an inner winding set 30 and another of the winding sets forming an outer winding set 32. An electric machine with a similar winding arrangement having two sets of hairpin windings is also described in U.S. Pat. No. 6,894,417, issued May 17, 2004 to Cai, et al., the contents of which are incorporated herein by reference.

Each winding set is comprised of a plurality of bar-shaped conductor segments, also referred to herein as "hairpins," having a substantially rectangular cross-section and positioned within the slots of the stator 12. Each of the plurality of hairpins 20 includes a "U" shaped end turn 24 and two legs 26. Each of the plurality of hairpins has a rectangular cross-sectional shape. The legs of the hairpins are positioned in the slots of the stator with each leg of the hairpin in a different stator slot such that the U-shaped end-turn of the hairpin extends over several stator slots (e.g., each U-shaped end-turn may extend six stator slots). Each hairpin inserted into a stator slot is staggered or "interleaved" with respect to adjacent hairpins. When a hairpin is fully inserted into the slots of the stator, the U-shaped end turn 24 will extend from one end of the stator (i.e., the insertion end 16), and the legs 26 will extend from the opposite end of the stator (i.e., the connection end 18). Any given stator slot will include a number of hairpin legs (e.g., 4), and each hairpin leg is referred to as a "layer" within the stator slot.

FIG. 5C shows a cross-section of a stator slot having four layers of conductors (i.e., legs) carrying either the same phase current or different phase current in the stator slot. The layers are referenced herein as the innermost layer (i.e., the layer closest to the neck of the slot and the inner diameter of the stator core) being layer 1, and the outermost layer (i.e., the layer furthest from the neck of the slot and closest to the outer diameter of the stator core) being layer 4. Insulation is included on the portion of each leg situated within a stator slot to prevent electrical connection between the legs in different layers of the same stator slot. The insulation may alternatively take the form of slot insulation provided inside each slot and between conductors.

The portion of the hairpin legs extending from the stator slots are bent in a desired configuration. To reduce winding height the legs on alternating layers are bent in opposite directions (e.g., the legs on layer one are bent counter-clockwise in the same direction and the legs on layer two are bent in the opposite direction, clockwise). The number of stator slots that each leg is bent is determined upon the design of the electric machine (e.g., each leg may be bent 2.5 slots so that the hairpin extends a total of nine slots from end-to-end in wave windings, if the end turn of one side extends four slots while the other extends five slots). As shown in FIG. 2B, the legs are bent such that each leg end 26 is positioned adjacent to another leg end. This allows an electrical connection be easily established between certain adjacent hairpin legs. In particular, once all hairpin legs are inserted into the stator and bent, an automated connection device is used to weld the legs 26 together. The term "adjacent leg ends" is used herein to refer to two hairpin leg ends from different hairpins that are immediately adjacent to one another when the legs are bent into the proper arrangement in the stator core. Non-adjacent leg ends are any leg ends that are not adjacent leg ends. The portion of the stator winding extending past the connection end 18 forms a winding head 44.

On the opposite side of the stator from the hairpin leg ends, the U-shaped end turns of the hairpins extend from the stator slots. As shown in FIG. 2A, the U-shaped end turns form (i) an inner winding set 30 comprising a first group of end-turns, and (ii) an outer winding set 32 comprising a second group of end-turns positioned on the exterior of the stator slots. In the disclosed embodiment, the winding sets do not overlap each other (i.e., the U-shaped end turns from different winding sets do not overlap each other), but instead the winding sets are "side-by-side" (i.e., concentrically positioned next to each other such that the U-shaped end turns are non-overlapping).

An exemplary winding arrangement for the electric machine is shown in FIGS. 3A-3C and FIG. 4. The disclosed winding arrangement provides fractional slot windings for the electric machine. Fractional slot windings result in the slots per pole per phase, q, being a factional number, such as where the slots per pole per phase, q, is equal to ³⁄₂, ⁵⁄₄, or some other non-integer number. As discussed above, introducing fractional slot windings can increase the flexibility of the series-turns per phase for the electric machine. By allowing for increased flexibility of the series-turns per phase, more options area available for an electric machine with a desired system voltage and/or torque for a given pole number and package size. This increases the applications available for multi-set hairpin windings. In other words, this option allows hairpin windings to be used more widely to adapt different voltage and torque requirement of electric machines.

The use of fractional slot windings allows for many different values for the series turns per phase, $N_{ph}$, to be achieved. Equation 1 above provides the equation for calculating the series turns per phase, $N_{ph}$. Examples of such series turns per phase values ($N_{ph}$) that may be achieved using fractional slot windings (where q is a non-integer number) are set forth in the table below. The calculations for $N_{ph}$ in the table below are based on a three phase machine having 12 poles (p=6) and two wave-wound sets (S=2). The $N_{ph}$ values are provided for wave windings with both one and two parallel paths per phase (a=1 or 2). Accordingly, the following equation for series turns per phase is used for the calcinations below: $N_{ph}=2pqS/a=2\cdot(6)\cdot q\cdot(2)/a=24q/a$.

$$q = 1\frac{1}{2} \Rightarrow N_{ph} = \begin{cases} 18 & \text{for } a = 2 \\ 36 & \text{for } a = 1 \end{cases}$$

$$q = 1\frac{1}{3} \Rightarrow N_{ph} = \begin{cases} 16 & \text{for } a = 2 \\ 32 & \text{for } a = 1 \end{cases}$$

$$q = 1\frac{1}{4} \Rightarrow N_{ph} = \begin{cases} 15 & \text{for } a = 2 \\ 30 & \text{for } a = 1 \end{cases}$$

$$q = 2\frac{3}{4} \Rightarrow N_{ph} = \begin{cases} 33 & \text{for } a = 2 \\ 66 & \text{for } a = 1 \end{cases}$$

Obviously, the above examples for series turns per phase, $N_{ph}$, cannot be obtained when the slots per pole per phase, q, is equal to an integer for a three phase machine welding with 12 poles and two wave-wound sets.

In general, the slots per phase per pole, q, in fractional slot windings can be written as a mixed fraction of the following form:

$$q = b \cdot (c/d) \qquad \text{(equation 2)}$$

where,
b=integer in the mixed fraction (q becomes proper fraction if b=0);
c=numerator in proper fraction part of the mixed fraction; and
d=denominator in the proper fraction part of the mixed fraction.

Equation 2, above, provides the number (N) of slots per phase that must be provided within a certain number of pole pitches (d). Specifically, for mixed fractions of q, equation 2 above means that N slots per phase are provided in d poles, where N=bd+c, and b, d, and c are defined as above for equation 2. For example, if q=1½, N=(2)(1)+(1)=3, which means 3 slots per phase within 2 pole pitches. As another example, if q=2¾, N=(4)(2)+(3)=11, which means 11 slots per phase within 4 pitches.

In multiphase windings, i.e., phase number m≧2, symmetrical or balanced windings are preferred. The symmetrical/balanced condition for windings with m phases can be written as follows:

$$\left. \begin{array}{l} \dfrac{d}{m} \neq \text{integer number} \\[6pt] \dfrac{2p}{d} = \text{integer number} \end{array} \right\} \qquad \text{(equation 3)}$$

Equation 3 means that the denominator in equation 2 cannot be three or a multiple of three for three phase symmetrical windings.

Because the locations of different winding sets in multi-set windings, shown in FIGS. 5A-5C, are not identical, the number of winding sets, S, does not affect parallel paths and symmetry of the multi-set windings. In other words, the maximum parallel paths for multi-set windings are the same as single set windings, i.e., $$a_{\max} = \frac{2p}{d} \qquad \text{(equation 4)}$$

However, $a_{max}=2$ for wave windings. The designed parallel path number, a, depends on the design requirements. However, the maximum number of parallel paths, $a_{max}$, has to be a multiple of the designed parallel paths, a, or "$a_{max}/a$=integer number", in order to keep the winding symmetrical. For example, for 3 sets of three phase 12 pole windings with slots per phase per pole q=1¼, the maximum parallel paths $a_{max}=3$ for lap windings, but $a_{max}=2$ for wave windings regardless pole number. The reason $a_{max}=2$ for wave windings is that the hairpins or coils under the same polarity are connected together in wave windings. Two is the maximum polarities for any machine, so the maximum parallel path for wave windings is two.

Besides providing a winding design that would be impossible if the value for q remained an integer, the fractional slot windings disclosed herein can be used to (i) reduce manufacturing cost with fewer armature slots, (ii) reduce AC resistance losses by allowing for wide slot width, and (iii) increase the reliability of the electric machine due to a reduction of the cycle time required to weld all winding connections.

Consider a three phase, two set (S=2), 12 pole (p=6) winding arrangement as an example. In order to reduce end-turn connections and jumpers, wave windings are preferred in the example, with either 1 or 2 parallel paths (a=1 or a=2). If the slots per phase per pole, q, is limited to an integer such as 1, 2, 3, etc, the series turns per phase could be $N_{ph}$=12, 24, 36, 48, 72 turns, etc., with all possible parallel path combinations. For the example herein, assume $N_{ph}$=36 turns is required on the basis of design analysis. With $N_{ph}$=36, two sets of hairpin windings can provide three slots per pole per phase (q=3) and two parallel paths (a=2). The total armature slots required to accommodate this arrangement will be 108 (i.e., (3 slots per phase per pole pitch)×(3 phases)×(12 poles)=108). With 108 slots, 216 hairpins will be required (i.e., 2 sets×108 slots=216 hairpins). Likewise, 216 hairpin welding points will be required as well as 216 slot insulation liners. Because of the high number of slots (108), narrow conductors will be required in a slot width direction, resulting in high AC resistance due to skin effect. Accordingly, the above arrangement, which is designed based on the slots per phase per pole, q, limited to an integer, has several drawbacks.

However, if the electric machine requiring $N_{ph}$=36 is designed with fractional slot windings, the above drawbacks may be reduced. For example, in the same three phase, two set (S=2), 12 pole (pole pairs p=6) winding arrangement, consider a fractional winding with q=1½ slots per phase per pole. If q=1½, only 54 armature slots are required. Specifically, based on equation 2, 3 slots per phase in 2 pole pitches are required. There are 3 phases and 12 poles in the example. Thus, (3 slots per phase)/(2 pole pitches)×(3 phases)×(12 poles)=54. This two set, three phase, 12 pole, 54 slot hairpin winding arrangement requires only 108 hairpins and provides a reasonably wide conductor width in each slot, which reduces manufacturing costs and increases the performance of the electric machine over the above design that did not include fractional slot windings. Furthermore, the 54 slot winding can connect all hairpins per phase in series, instead of two parallel paths in windings of q=2. This will reduce additional losses, vibration, etc. caused by imbalance among parallel paths.

Figure 3A:
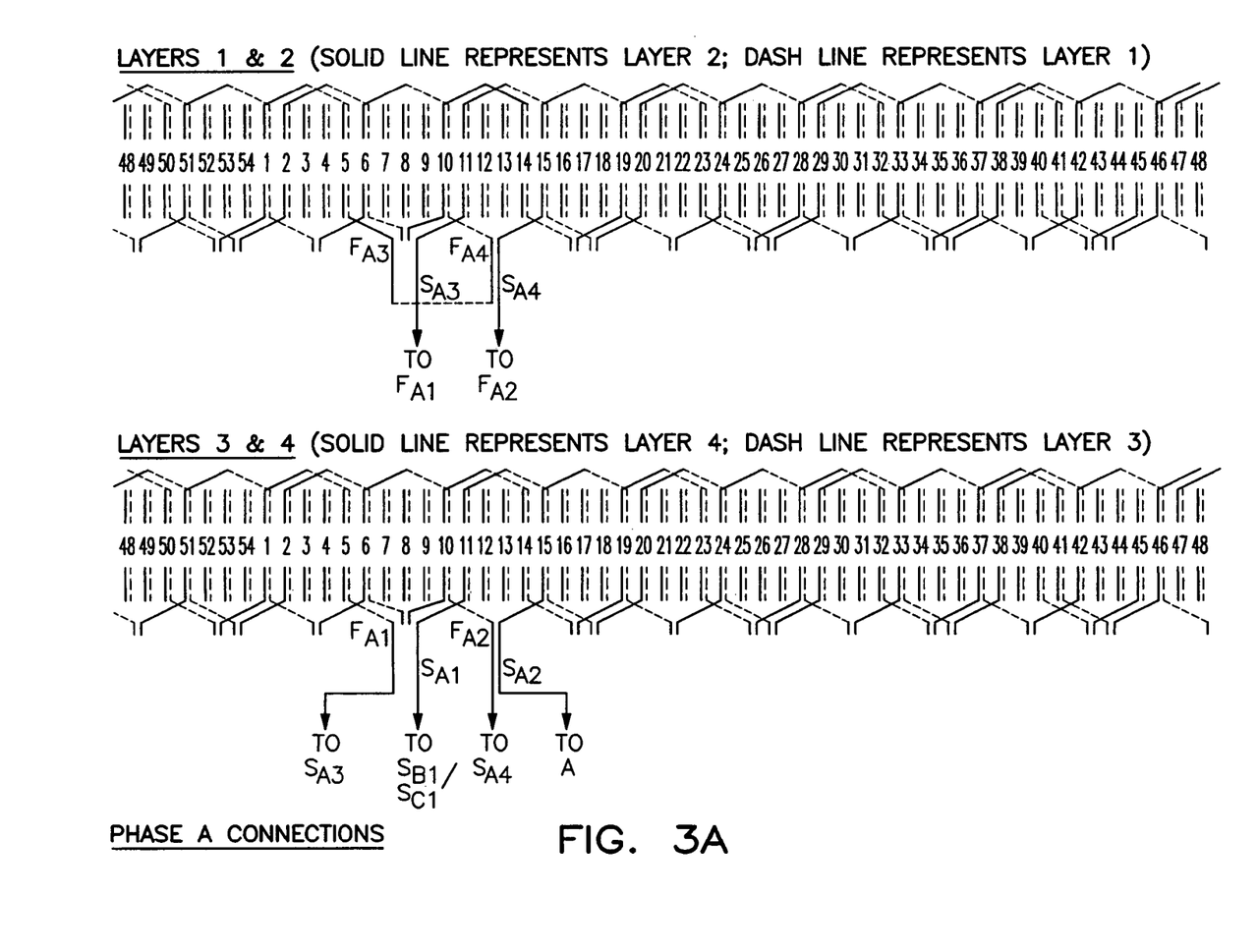
FIG. 3A shows an exemplary fractional slot winding arrangement for phase A of an electric machine having segmented bar-shaped windings, such as the electric machine of FIG. 2A.
Figure 3B:
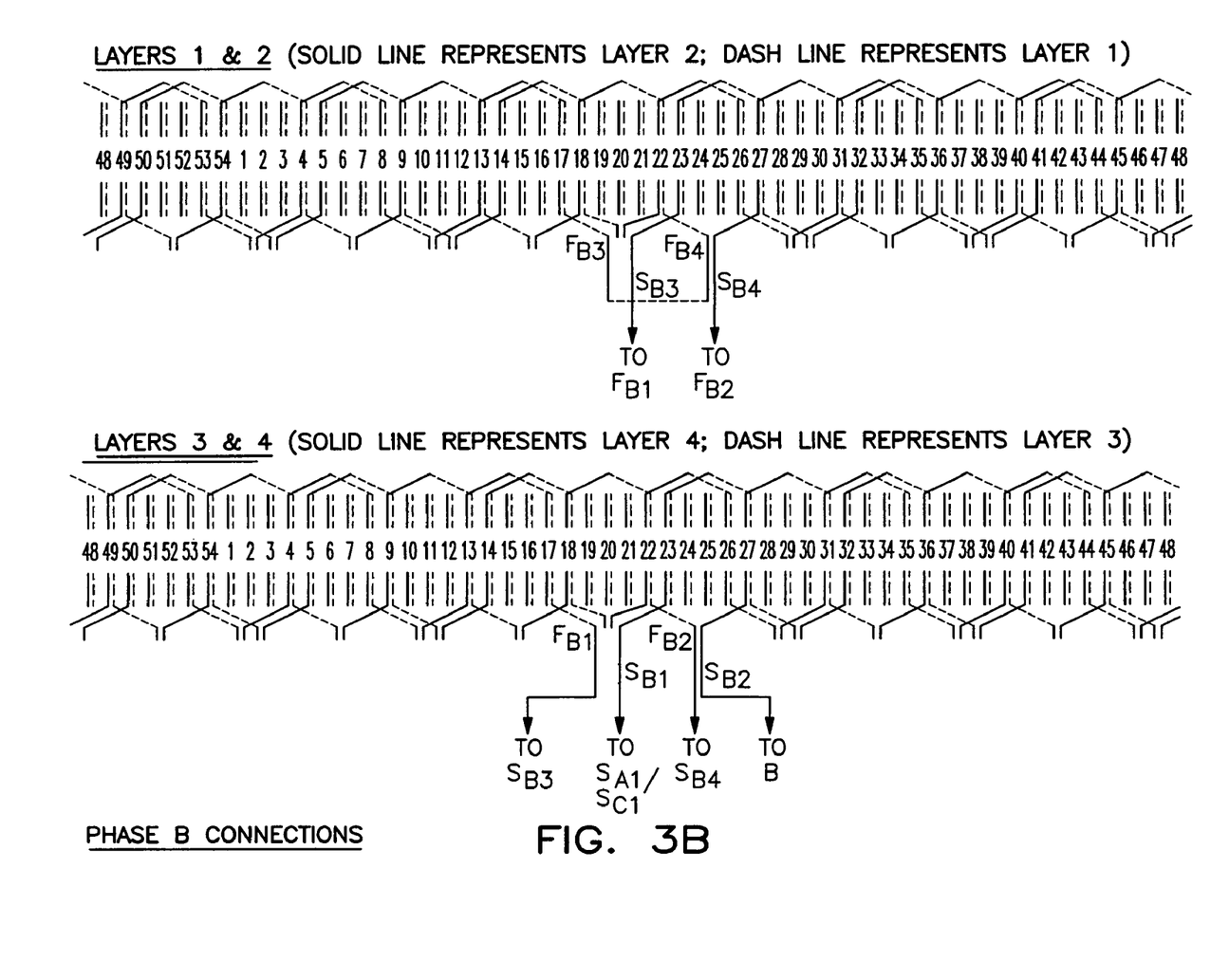
FIG. 3B shows phase B of the winding arrangement of FIG. 2A.
Figure 3C:
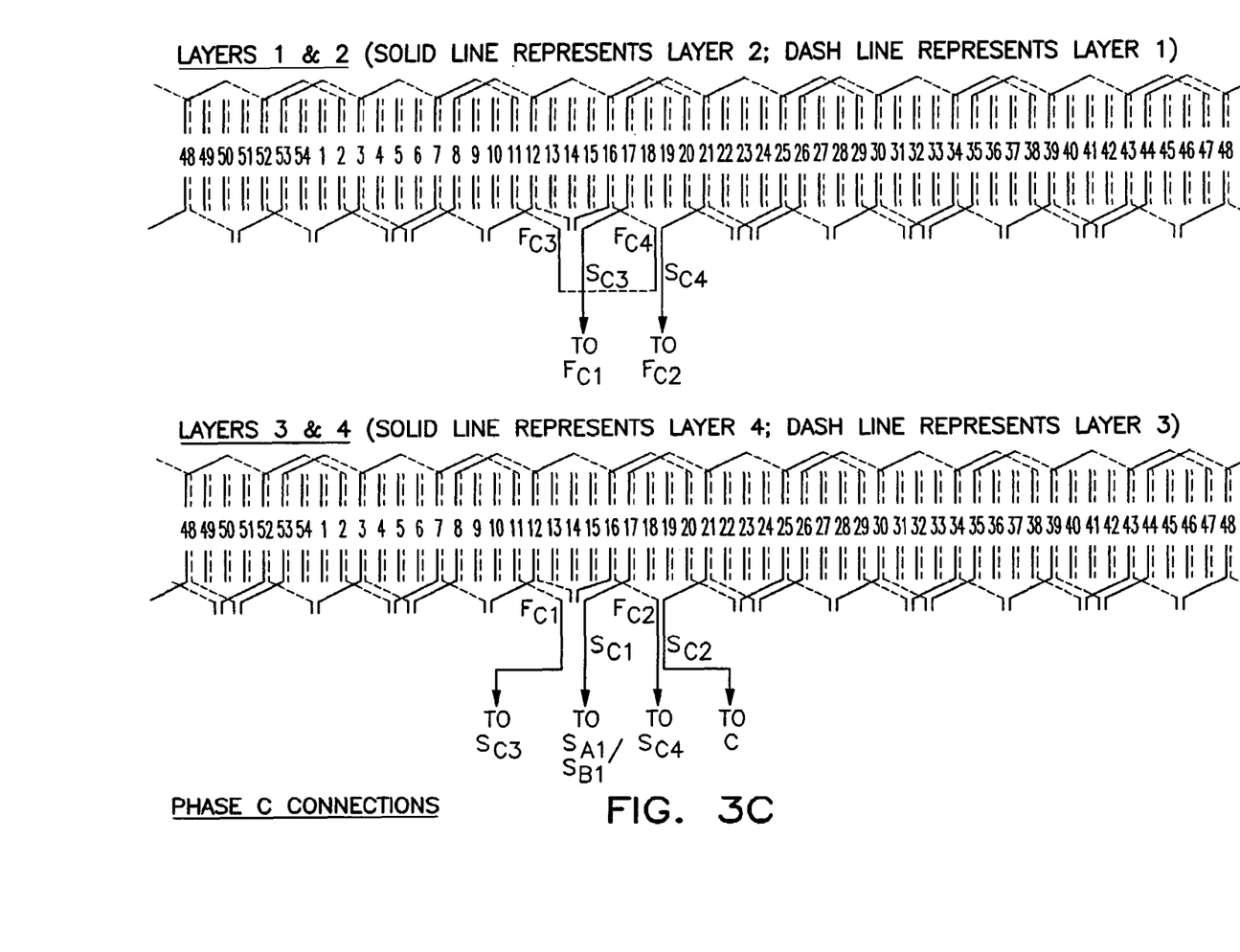
FIG. 3C shows phase C of the winding arrangement of FIG. 2A.

The fractional slot winding arrangement of the above example is shown in FIGS. 3A-3C. FIG. 3A shows phase A of the three phase, two-set AC winding arrangement with 12 poles wound in 54 slots of the stator of an electric machine. The windings in the example provided are in two sets of windings, similar to that shown in FIG. 5C. Winding set 1, comprises the conductors in layers 1 and 2 of FIG. 4. Winding set 2 comprises the conductors in layers 3 and 4 of FIG. 4.

Figure 4:
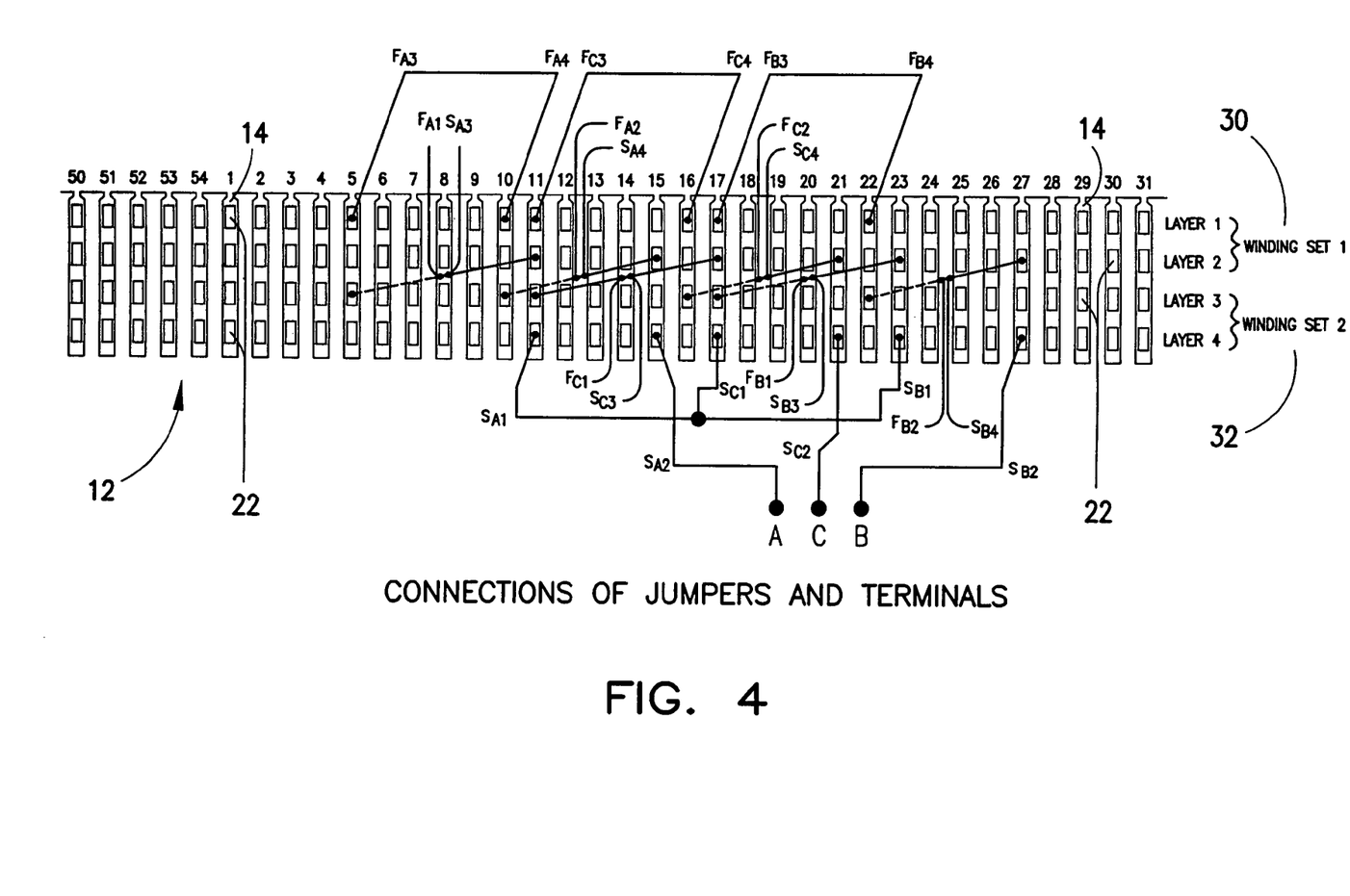
FIG. 4 shows the jumper connections and terminals of the winding arrangement of FIG. 2A.

FIG. 4 generally provides a detailed look at the end-turn jumpers and connections that are required to complete phase A of the exemplary winding arrangement. In this example, the layers are defined as the 1st through 4th from the top to the bottom of a slot, with layer 1 the innermost layer near the partial opening in the slot, and layer 4 to outermost layer. The 1st & 2nd layers consist of winding set 1 while the 3rd & 4th layers consist of winding set 2. In FIG. 4, the lines superimposed over the conductor layers show the connections between hairpin leg ends of two winding sets on the connection end of the stator. Of course, the conductor layers are also connected by U-shaped end turns at the insertion end of the stator, and welds at the connection end of the stator, but these connections are not provided for clarity in FIG. 4. These connections between the hairpins are shown in FIGS. 3A-3C.

With reference to FIG. 3A, a winding schematic is shown depicting the bending and connection required for the hairpins for phase A of the winding arrangement. As can be seen in FIG. 3A, the hairpins are inserted in the fifty-four slots of the stator. The U-shaped hairpin bends are generally shown above the stator slots, and the leg-end connections between hairpins are generally shown below the stator slots in the diagram. The first pitch Y1 of the windings (hairpin pitch) is 4 (this is the number of slots that the U-shaped end turns span). For example, starting in layer 2 of slot 15 and following the reference line to layer 1 of slot 19, it can be seen that this connection extends 4 slots. The second pitch, Y2, of the windings (hairpin connection pitch) is 5 (this is the number of slots that the connected legs span). For example, starting at layer 1 in slot 15 of FIG. 3A and following the reference line to layer 2 of slot 20, it can be seen that this connection extends 5 slots. FIG. 3B shows a similar winding schematic for phase B of the exemplary winding arrangement. FIG. 3C shows a similar winding schematic for phase C of the exemplary winding arrangement.

As is evident from FIG. 3A, phase A accounts for 12 poles of the winding arrangement (i.e., 2 poles for every 9 slots). Likewise, phase B accounts for 12 poles, as shown in FIG. 3B, and phase C accounts for 12 poles. Thus, a fractional slot winding arrangement is provided. Specifically, 1½ slots per pole per phase are provided, with 36 poles provided over the 54 slots of the stator core.

As described above, advantages may be realized by designing an electric machine for an automotive or marine engine, wherein the electric machine includes multi-phase fractional slot windings made of segmented bar-shaped windings. Accordingly, a method of designing an electric machine for an automotive or marine engine includes determining a desired system voltage, pole number and package size. Based on the desired system voltage, pole number and package size of the electric machine, the desired number of turns in series per phase, $N_{ph}$, is calculated. In particular, phase EMF is proportional to $N_{ph}$, and the EMF is used to balance system voltage. Thus, different levels of system voltage require different $N_{ph}$ values. However, with the pole number of the electric machine determined, it may be difficult to arrive at the desired $N_{ph}$, according to equation 1, if wave windings are desired (since $a_{max}$=2). By manipulating q to a fractional number, a number very close to the desired $N_{ph}$ may be achieved, thus allowing the electric machine to be designed with the desired system voltage, pole number and package size.

Although the present invention has been described with respect to certain preferred embodiments, it will be appreciated by those of skill in the art that other implementations and adaptations are possible. For example, many other fractional slot winding arrangements other than those shown in FIGS. 3A-3C are possible. In addition, the electric machine may be incorporated into various vehicles, including automotive vehicles, marine vehicles, and aerospace vehicles, as well as other industrial applications. Moreover, there are advantages to individual advancements described herein that may be obtained without incorporating other aspects described above. Therefore, the spirit and scope of the appended claims should not be limited to the description of the preferred embodiments contained herein.

What is claimed is:

1. An electric machine comprising:

a) a core defining a plurality of slots;

b) multi-phase fractional slot windings positioned in the slots of the core, the multi-phase windings including a first winding set comprised of a first plurality of conductors having a substantially rectangular cross-sectional shape and a second winding set comprised of a second plurality of conductors having a substantially rectangular cross-sectional shape, wherein the multi-phase fractional slot windings are provided as wave windings and include a non-integer slots per pole per phase value of q, q being a mixed fraction in the form of b·(c/d), wherein the value of d is not equal to three or a multiple of three, and wherein the number of parallel paths per phase of the multi-phase fractional slot windings is less than or equal to two.

2. The electric machine of claim 1 wherein the multi-phase fractional slot winding comprises a three-phase winding.

3. The electric machine of claim 1 wherein the first plurality of conductors and the second plurality of conductors comprise at least four layers of conductors in each of the plurality of stator slots and wherein the first plurality of conductors are positioned in the first and second layer of the plurality of stator slots and the second plurality of conductors are positioned in the third and fourth layers of the plurality of stator slots.

4. The electric machine of claim 1 further comprising a third winding set comprised of a third plurality of conductors.

5. The electric machine of claim 1 wherein the core is a stator core.

6. The electric machine of claim 1 wherein the multi-phase windings are balanced.

7. The electric machine of claim 1, wherein the stator defines 54 slots, wherein the multi-phase fractional slot windings have two winding sets comprised of the first winding set and the second winding set, and wherein $q=1\frac{1}{2}$.

8. A hybrid electric vehicle comprising:
   a) an internal combustion engine; and
   b) an electric machine operably connected to the internal combustion engine,
      wherein the electric machine comprises
      i) a rotor;
      ii) a stator defining a plurality of slots;
      iii) multi-phase fractional slot windings positioned in the slots of the stator, the multi-phase windings including a first winding set comprised of a first plurality of conductors having a substantially rectangular cross-sectional shape and a second winding set comprised of a second plurality of conductors having a substantially rectangular cross-sectional shape, wherein the multi-phase fractional slot windings are provided as wave windings and include a non-integer slots per pole per phase value of q, q being a mixed fraction in the form of b·(c/d), wherein the value of d is not equal to three or a multiple of three.

9. The hybrid electric vehicle of claim 8 wherein the first plurality of conductors and the second plurality of conductors comprise at least four layers of conductors in each of the plurality of stator slots and wherein the first plurality of conductors are positioned in the first and second layer of the plurality of stator slots and the second plurality of conductors are positioned in the third and fourth layers of the plurality of stator slots.

10. The hybrid electric vehicle of claim 8 wherein the first plurality of conductors are hairpin conductors and the second plurality of conductors are hairpin conductors.

11. The hybrid electric vehicle of claim 8, wherein the stator defines 54 slots, wherein the multi-phase fractional slot windings have two winding sets comprised of the first winding set and the second winding set, and wherein $q=1\frac{1}{2}$.

* * * * *